Figure 4:
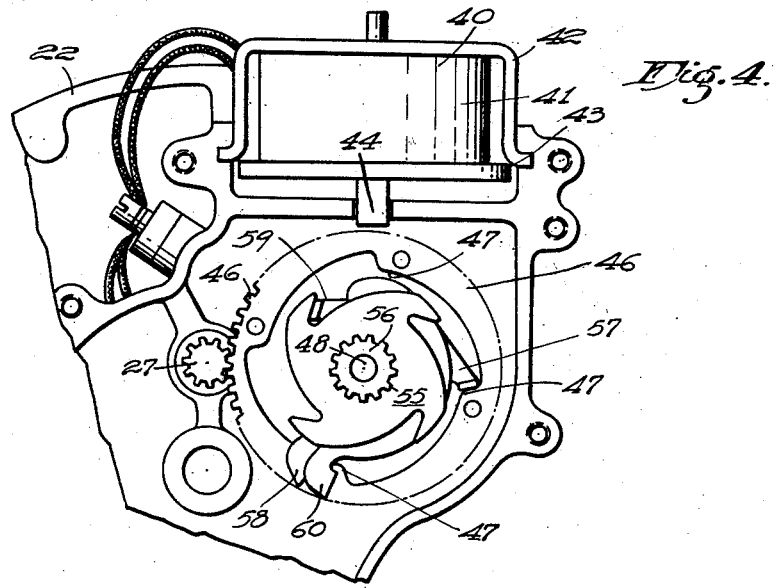

April 16, 1935. W. M. EMERY 1,997,682
CLUTCH MECHANISM
Filed Sept. 30, 1932 4 Sheets-Sheet 1
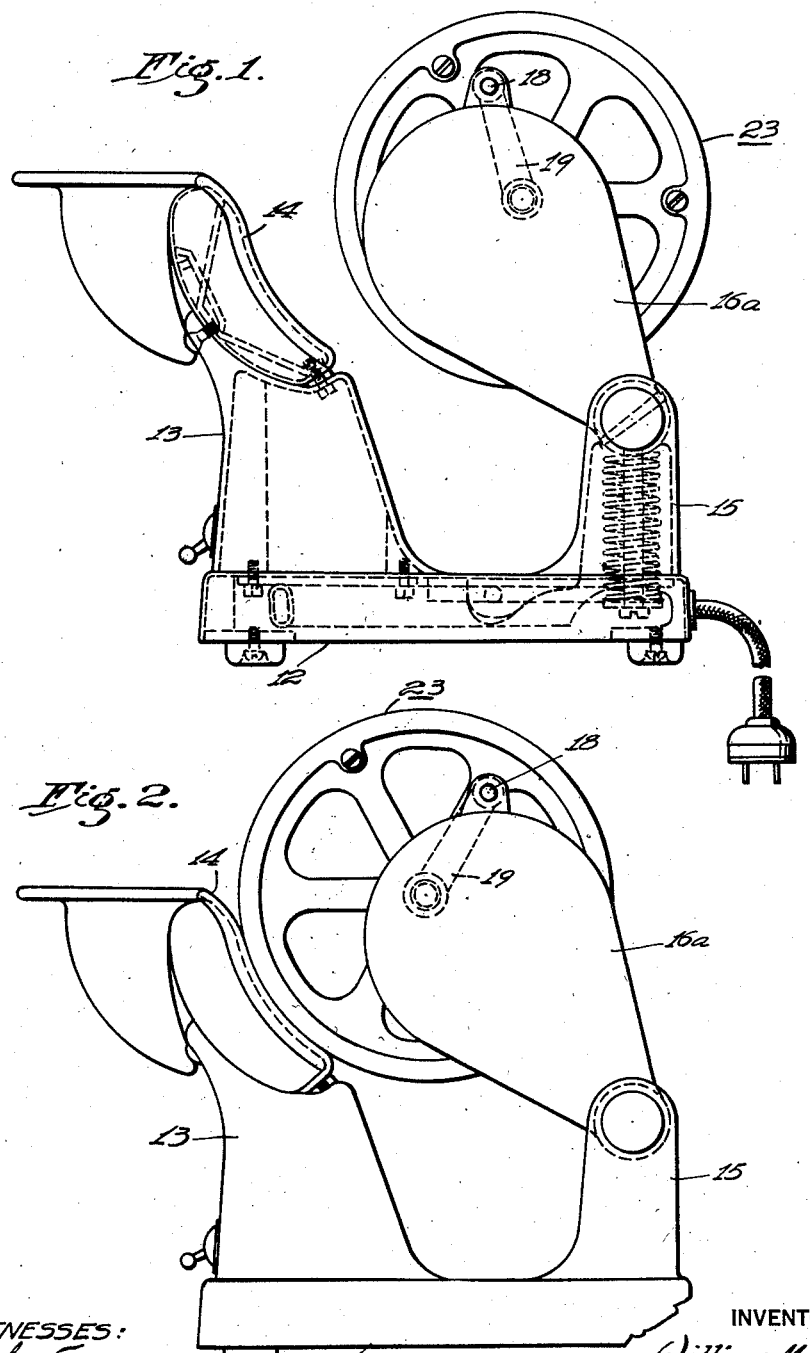

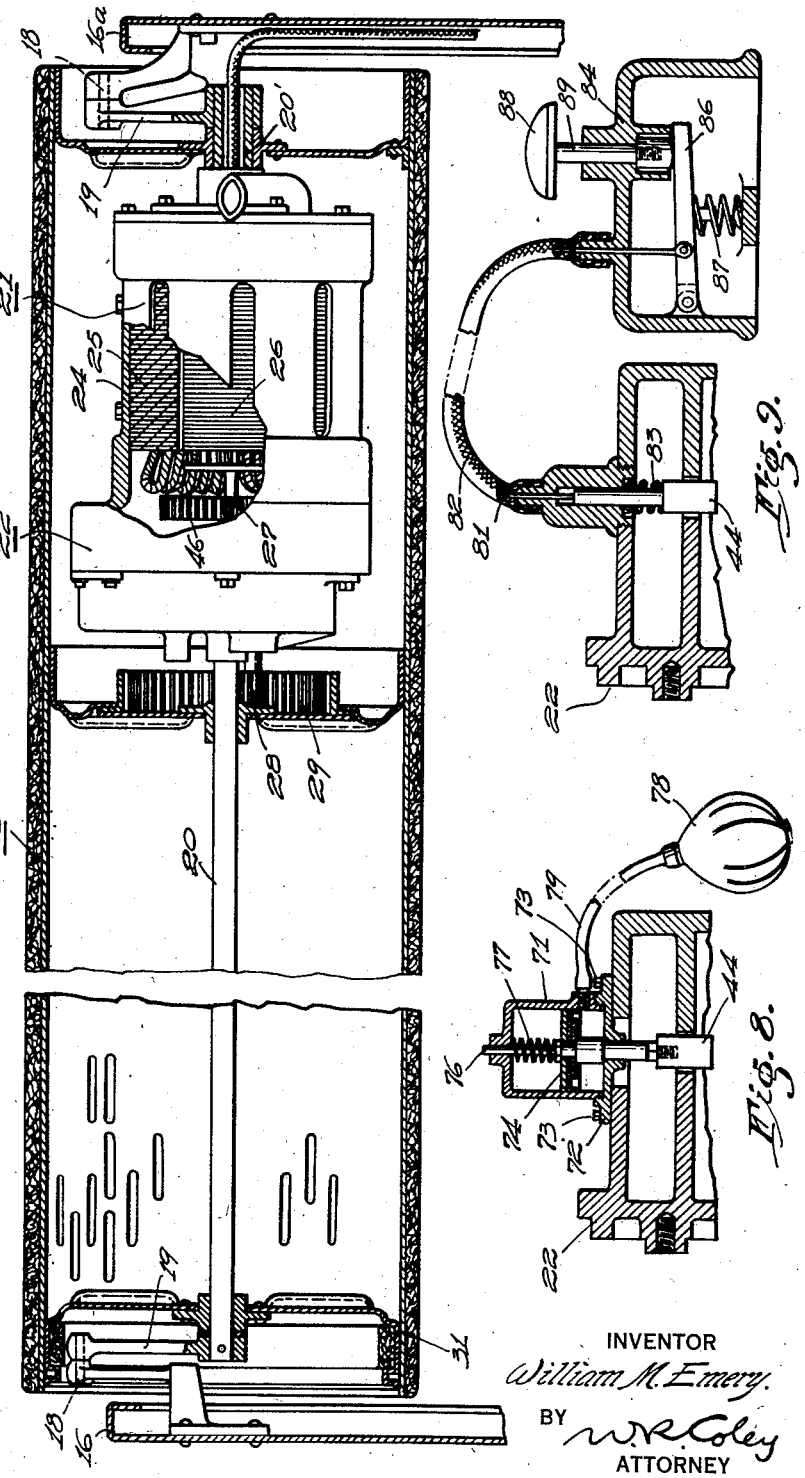

April 16, 1935.  W. M. EMERY  1,997,682
CLUTCH MECHANISM
Filed Sept. 30, 1932  4 Sheets-Sheet 3

WITNESSES:
E. O. Leiding
N M Biehl

INVENTOR
William M. Emery.
BY W R Coley
ATTORNEY

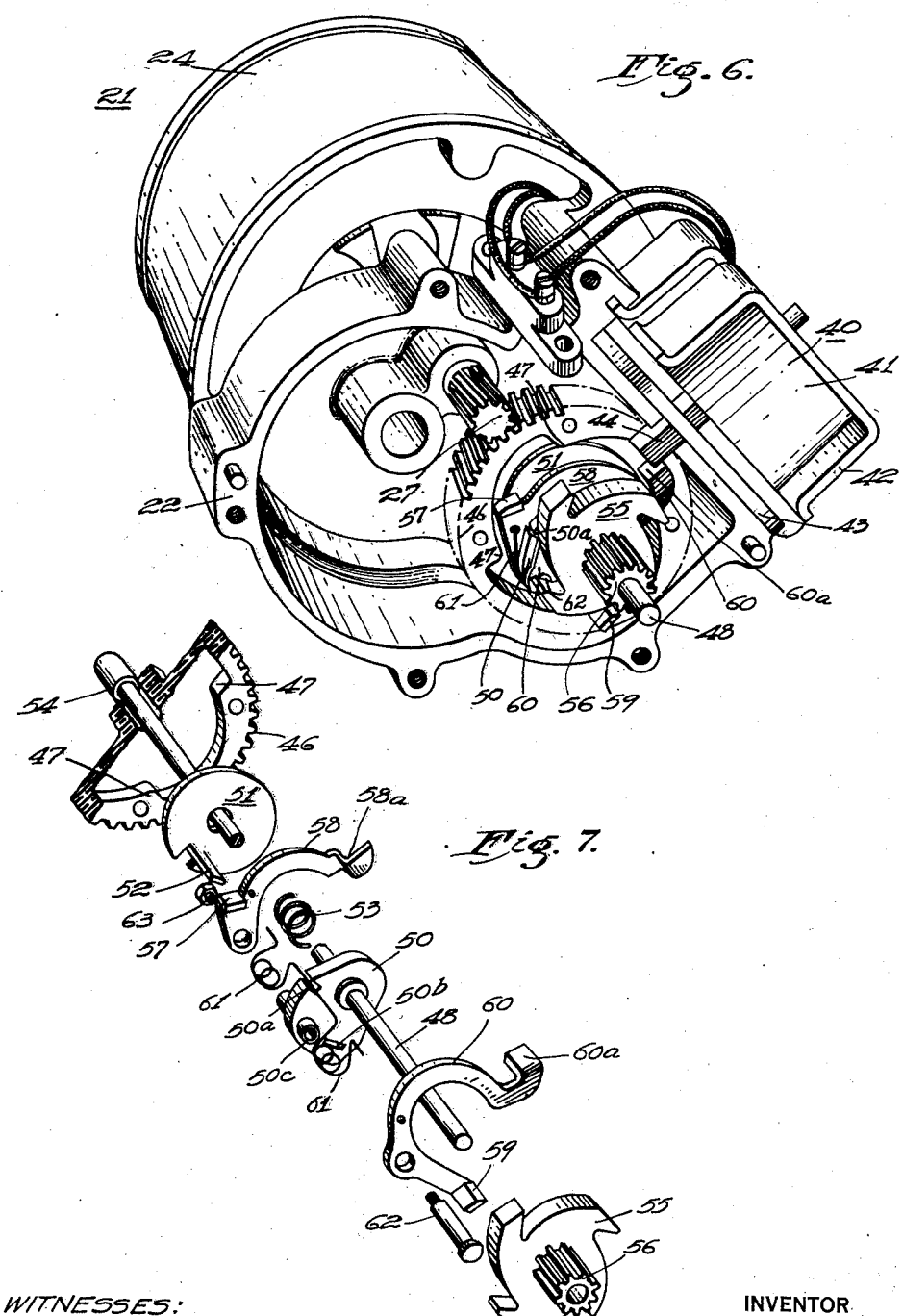

Patented Apr. 16, 1935

1,997,682

UNITED STATES PATENT OFFICE 1,997,682

CLUTCH MECHANISM

William M. Emery, Lansdowne, Pa., assignor to Westinghouse Electric & Manufacturing Company, a corporation of Pennsylvania Application September 30, 1932, Serial No. 635,521

8 Claims. (Cl. 192—28)

My invention relates to clutches and is herein illustrated by showing its application to an ironing machine.

An object is to provide a clutch mechanism suitable for control by an alternating-current electromagnet.

Another object is to provide a clutch in which the energy required to control it is reduced to a minimum and is not variable with the load transmitted by the clutch.

Another object is to provide a clutch in which the driven member is entirely free when disengaged.

Another object is to provide a reliable and positive clutch operative at high speeds.

A final object is to improve the control and clutch mechanisms on ironing machines.

Figure 5:
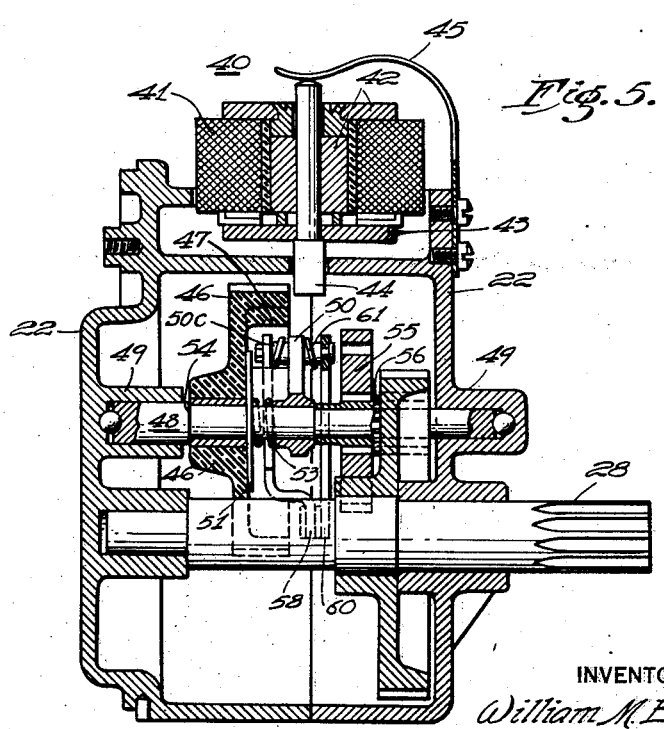

In the drawings:

Figure 1 is an elevational view of the right-hand end of an ironing machine with the roll at rest in stable equilibrium and separated from the shoe, Fig. 2 is a similar view with the roll moved to the shoe, Fig. 3 is a view in longitudinal section, showing the interior of the roll, Fig. 4 is a fragmentary view in end elevation, showing the clutch, Fig. 5 is a longitudinal sectional view of the clutch and gearbox, Fig. 6 is a perspective view of the motor and clutch parts, Fig. 7 is an exploded perspective view showing the individual parts of the clutch, and Figs. 8 and 9 are fragmentary views, in section, showing modified forms of manual control means for the clutch.

Applicant believes that his clutch invention, per se, as a machine element, is subject to many useful applications and the use herein shown should be considered but a random selection from its broad field of application.

For this reason the applicant will describe the structure of the ironing machine without extended explanation. Full details and explanation are contained in his copending applications Serial No. 632,498, filed September 10, 1932, and Serial No. 630,351, filed August 25, 1932.

In Figs. 1, 2 and 3 is shown an ironer including a base 12, an upstanding support 13 attached thereto for a shoe 14 adapted to be heated. On the rear of the base is resiliently mounted a support 15 and fixed relative thereto is a yoke having yoke ends 16 and 16a, which support pivots 18 from which swing arms 19, in which are fixedly mounted spindles 20 and 20' on which a motor 21 and a gearbox 22 are fixedly mounted. A power unit structure is thus formed, each part fixed relative to the others and consisting of the parts 19, 20, 20', 21 and 22 just described. A padded roll structure 23 including a padded metal cylinder and three spiders, is rotatably mounted on spindles 20 and 20'. The power unit structure and the roll structure are normally free to swing on pivots 18.

Motor 21, as shown in Fig. 3, includes a housing 24, a stator 25, fixed to said housing by screws, bolts or by welding, and a rotor 26 with a shaft on which is cut a pinion 27 which extends into the gearbox 22.

It should be noted that the stator in this ironer is not bolted rigidly to some fixed support, as it is in most motor applications, but is free to turn or swing on pivots 18 towards and away from the shoe as a result of reactive forces associated with it.

On the left end of the roll is shown a brake band 31 (see Fig. 3) which acts against the rotation of roll 23 being held itself against rotation by an operative connection (not shown) with left-hand yoke end 16.

The gear reduction mechanism consists generally of three spur gear reductions, two in the gearbox and one outside, the latter consisting of a pinion 28 and an internal gear 29, which gear is fixedly attached to the roll structure. The clutch is located between the first and second reductions.

Referring now to the clutch mechanism, Figs. 4, 5, 6 and 7 show a gear housing 22 on which is mounted a small electromagnet 40 which includes coil 41, a stationary yoke 42, and a reciprocating armature 43 having integral therewith a projection 44, normally moved into the gearbox 22 by a spring 45 shown only in Fig. 5, and constituting an obstacle.

Motor pinion 27, as shown in Fig. 4, meshes with gear 46 having four internal ratchet teeth 47. Gear 46 is loosely mounted on a shaft 48 which is loosely mounted in bearings 49 in gearbox 22. A supporting member 50 of substantially cam shape is rigidly secured to shaft 48 intermediate its ends and is provided with a recess 50a in its surface and with an opening 50b therethrough as well as with a tubular member 50c also extending therethrough, all for purposes to be hereinafter set forth.

A drag or friction means 51 in the form of a flat disc is loosely anchored relatively to member 50 by a laterally-extending integral lug 52 fitting loosely in opening 50b. Disc 51 is pressed into a recess in gear 46 by a spring 53 one end of which abuts against member 50.

A ratchet wheel 55 having four external ratchet teeth and a pinion 56 integral therewith is also loosely mounted on shaft 48 at one side of the cam-shaped member 50.

A curved lever arm 58 having a pawl 57 thereon intermediate its ends is pivotally mounted at one end thereof on one side of member 50 on tubular member 50c. A second curved lever arm 60 having a pawl 59 at one end thereof is pivotally mounted on the other end of tube 50c at the other side of member 50. A light double torsional spring 61 provides the small pressure necessary to keep pawls 57 and 59 normally in engagement with the teeth of ratchets 47 and 55 respectively. The arms 58 and 60 have projections 58a and 60a at one end thereof adapted to be engaged by obstacle 44 as will be hereinafter described.

A machine bolt 62 extends through openings in arms 60 and 58, through tube 50c and through the turns of spring 61 to hold these members in proper assembled and operative positions, a nut 63 being provided to hold the bolt 62 when once assembled. While a machine bolt has been shown, it is possible to use a rivet.

When rotor pinion 27 rotates in normal operation and coil 41 is energized and the obstacle 44 withdrawn by the magnet, then all the parts shown in Fig. 7 revolve as a unit. When the magnet 40 is deenergized and spring 45 moves the projection or obstacle 44 into the path of pawl levers 58 and 60, the unit continues to revolve until lever arm 58 causes the disengagement of pawl 57 with one of the ratchet teeth 47, at which time gear 46 continues to revolve, shaft 48 and parts 50, 51, 53, 58, 57, 61, 59 and 60 (see Fig. 7) remain stationary, held from revolving with gear 46 because pawl levers 58 and 60 have been stopped by obstruction 44 and held from revolving or creeping in the reverse direction under the reactive forces of frictional drag 51 pressed against gear 46 by the spring 53. Ratchet wheel 55 and pinion 56 are left free on shaft 48 to revolve in either direction. The members 48, 50, 51, 53, 58, 57, 60 and 59 constitute what may be termed an intermediate floating mechanism.

A manual control device for the projecting member 44 is shown in Fig. 8 of the drawings and includes a cylinder 71 operatively associated with the gear box 22 and secured thereto as by means of flange 72 and a plurality of bolts 73. A piston 74 is mounted on an extension of member 44, which extension may constitute a piston rod 76. A spring 77 biases the piston assembly and the obstacle 44 to the position shown in the drawings. A bulb 78 is operatively connected to the cylinder 71 by a flexible hose 79 in such manner as to counteract the bias caused by the spring 77. When the bulb 78 is compressed by an operator using either the hand, knee or foot, the piston and the projection 44 are moved upwardly or away from the member 22 so that the obstacle 44 will be moved out of engagement with the clutch in the same manner as has been set forth for the electromagnetic actuator.

I have shown another form of manual control in Fig. 9, including a wire 81 freely movable in a hose 82. A compression spring 83 biases the projection 44 to its outward position where it may engage lever arms 58 and 60 to cause a disengagement of the clutch. A small casing 84 has a foot-operated lever 86 pivotally mounted therein, a spring 87 biasing the lever to a predetermined position. The wire 81 is connected to the lever 86. An actuating knob 88 on a push rod 89 permits of moving the lever against the spring 87, so that pressure on the knob effects movement of the obstacle 44 out of the path of travel of lever arms 58 and 60 of the clutch in substantially the same manner as was hereinbefore mentioned for the electromagnetic control.

The lever arms and pawls work independently in engaging except that in engaging, pawl 57 always engages ratchet teeth 47 a trifle before its mate arm engages (see the overlapping shape of pawl lever 60), and upon disengaging, lever arm 60 strikes obstacle 44 first and disengages pawl 59 from ratchet wheel 55 a trifle in advance of the disengagement of its mating pawl arm. This appears to be necessary for smooth operation.

In operating clutches with alternating-current magnets, the difficulty heretofore has been that where much load is placed on the magnet the armature will chatter and be noisy. In my application, the work done by the magnet is a minimum. The clutch is normally energized and the actual work of disengaging the clutch is done by the momentum of the parts, when the magnet is inoperative because it is deenergized and the work of engaging the clutch is irrespective of the magnet. Should the current source fail the clutch will be automatically disengaged because the rotating parts have sufficient momentum to cause their disengagement when obstructed.

While I have shown a specific embodiment of my invention and as applied to an ironer, I do not desire to be limited to the particular details shown as the scope of the claims is to be limited only by the prior art.

I claim as my invention:—

1. In a clutch, in combination, a loosely mounted shaft, a driving gear loosely supported on the shaft and having internal ratchet teeth, a driven gear having external ratchet teeth loosely mounted on the shaft, a disc fixed on the shaft between said driven and driving gears, a pair of arms, pivotally mounted on the disc at the respective sides thereof, each arm having a pawl thereon adapted to engage with and be disengaged from the respective internal and external ratchet teeth and a single spring carried by the disc tending to hold the pawls in engagement with the cooperating ratchet teeth.

2. In a clutch, in combination, a loosely mounted shaft, a driving gear loosely supported on the shaft and having internal ratchet teeth, a driven gear having external ratchet teeth associated therewith loosely mounted on the shaft, a disc fixed on the shaft between the driven and the driving gear, a pair of pawl arms pivotally mounted on the disc at the opposite sides thereof and adapted to engage the ratchet teeth to transmit motion from the driving gear to the driven gear, resilient means carried by the disc to yieldingly urge the pawl arms into engagement with the respective ratchet teeth and means movable into the path of movement of the pawl arms to cause disengagement of the pawl arms and the ratchet teeth.

3. A device as set forth in claim 2 and including a friction disc on the shaft interlocked with the fixed disc and spring pressed against the driving gear to prevent creeping of the clutch when the pawl arms are out of engagement with the respective ratchet teeth.

4. A device as set forth in claim 2 and including a friction disc loosely mounted on the shaft and located between the driving gear and the fixed disc, a lug on the friction disc extending into the fixed disc and a spring surrounding the shaft between the friction disc and the fixed disc to press the friction disc against the driving gear to prevent reverse turning movement of the clutch when the pawl arms are out of engagement with the respective ratchet teeth.

5. A device as set forth in claim 2 in which the pawl-arm-disengaging means includes a radially-movable obstacle.

6. A device as set forth in claim 2 in which the pawl-arm-disengaging means includes a manually-controlled radially-movable obstacle.

7. A device as set forth in claim 2 in which the pawl-arm-disengaging means includes an obstacle adapted to move into the path of travel of both pawl arms and engage them in predetermined sequence.

8. A device as set forth in claim 2 in which the pawl-arm-disengaging means includes an obstacle yieldingly pressed into the path of travel of both pawl arms and manually-controlled means to move the obstacle out of the path of travel.

WILLIAM M. EMERY.